(12) United States Patent
Kato et al.

(10) Patent No.: US 6,778,726 B2
(45) Date of Patent: Aug. 17, 2004

(54) OPTICAL SWITCH

(75) Inventors: Masayuki Kato, Kawasaki (JP); Akio Sugama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/386,667

(22) Filed: Mar. 13, 2003

(65) Prior Publication Data

US 2003/0179976 A1 Sep. 25, 2003

(30) Foreign Application Priority Data

Mar. 20, 2002 (JP) .......................... 2002-079243

(51) Int. Cl.⁷ .................................................. G02B 6/26
(52) U.S. Cl. ............................ 385/16; 385/14; 385/15; 385/39; 385/40; 385/130; 385/131; 385/132; 385/11
(58) Field of Search ........................... 385/8, 9, 10, 11, 385/14, 15, 16, 39, 40, 130, 131, 132

(56) References Cited

U.S. PATENT DOCUMENTS

| | | | | |
|---|---|---|---|---|
| 5,239,598 A | * | 8/1993 | Wight et al. .................... 385/8 |
| 5,371,817 A | * | 12/1994 | Revelli, Jr. et al. | |
| 5,418,871 A | * | 5/1995 | Revelli et al. ................ 385/44 |
| 5,940,548 A | * | 8/1999 | Yamada et al. ............... 385/14 |
| 6,321,009 B1 | * | 11/2001 | Klein Koerkamp .......... 385/45 |
| 2003/0039430 A1 | * | 2/2003 | Deliwala ....................... 385/14 |
| 2003/0039447 A1 | * | 2/2003 | Clapp ........................... 385/40 |
| 2003/0040175 A1 | * | 2/2003 | Dellwala ..................... 438/669 |
| 2003/0048975 A1 | * | 3/2003 | Lackritz et al. ............... 385/14 |
| 2003/0179976 A1 | * | 9/2003 | Kato et al. ..................... 385/8 |
| 2004/0013953 A1 | * | 1/2004 | Mune et al. .................. 430/18 |

* cited by examiner

*Primary Examiner*—Brian M. Healy

(57) ABSTRACT

An optical switch has a slab waveguide for eliminating polarization dependency between a TE mode optical signal component and a TM mode optical signal component. Disposed on one end of the waveguide is a first deflection portion formed of electro-optical crystal and disposed on the other end of the waveguide is a second deflection portion also formed of electro-optical crystal, in which a half waveplate is disposed at a substantially center portion between the two ends of the slab waveguide. The optical signal propagated from the first deflection portion to the second deflection portion has a TE mode component and a TM mode component thereof switched with respect to each other by the half waveplate.

9 Claims, 6 Drawing Sheets

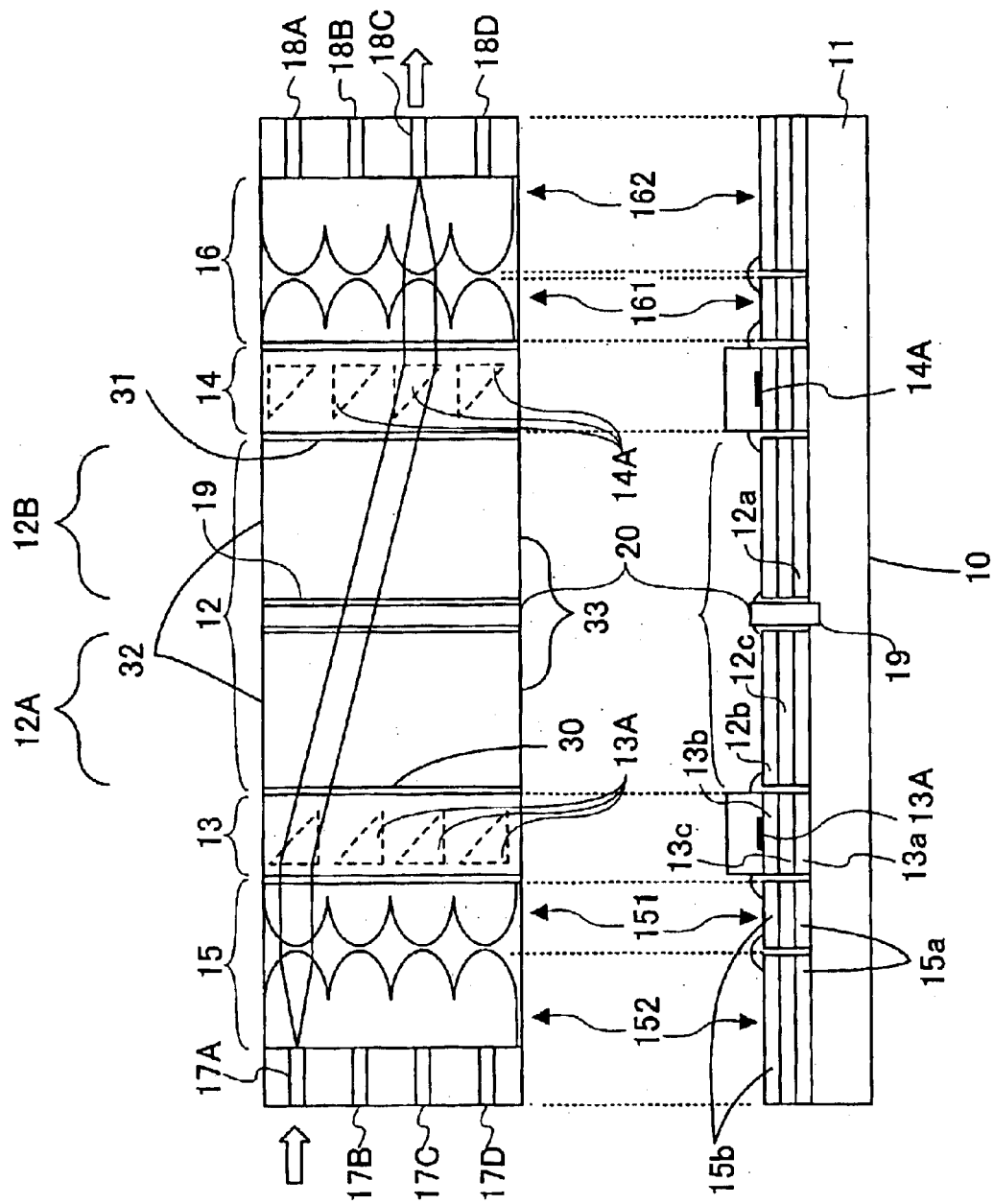

OPTICAL SWITCH

CROSS-REFERENCE TO RELATED APPLICATIONS

This application is based upon and claims the benefit of priority from the prior Japanese Patent Application No. 2002-079243, filed in Mar. 20, 2002, the entire contents of which are incorporated herein by reference.

BACKGROUND OF THE INVENTION

1. Field of the Invention

The present invention generally relates to an optical element, and more particularly to an optical switch.

2. Description of the Related Art

Owing to today's spread in optical communication technology, the amount of information transmitted through optical communication systems are growingly increasing. In response to the growing increase, today's optical communication system transmits optical signals at numerous wavelengths through a single optical fiber by using a multiplex wavelength technique.

Meanwhile, an optical switching device serving to switch optical signals in a backbone communication network is required for the foregoing optical communication systems, in which the core for such optical switching device is considered to be an optical switch capable of switching the path of the optical signals at a high speed.

The polarization characteristic of the optical signals transmitted through the optical fiber is typically random, and therefore, the polarization plane thereof, normally, vibrates randomly.

Accordingly, even when an incoming optical signal has random polarization planes, the optical switch for the optical communication system using optical fiber is required to perform in a manner independent from such polarization planes.

Japanese laid-open publication No.4-234020 shows a waveguide type optical switch which separates TE mode and TM mode, and then, recombines the modes after switching the modes.

Japanese laid-open publication No.3-216622 shows an optical switch using an electro-optical effect which suitably selects the direction of an electro-optical crystal, to thereby achieve polarization independence with respect to the electro-optical effect.

FIG. 1 shows a structure of an optical switch according to the aforementioned Japanese laid-open publication No.4-234020.

With reference to FIG. 1, an optical switch formed on a GaAs substrate 1 on plane (111) has ridges 2 corresponding to plural separating and intersecting optical waveguides formed on the GaAs substrate 1. The ridges 2 have electrodes 3 disposed at separating portions and intersecting portions thereof.

In FIG. 1, an optical waveguide layer 1A is formed above the GaAs substrate 1 in a manner sandwiched between a conductive clad layer 1B and a non-doped clad layer 1C. The optical waveguides are formed as non-conductive type clad layers disposed on the non-doped clad layer 1C. Accordingly, an inputted optical beam is guided through the optical waveguide layer 1A along the ridges 2 by a refractive index effect of a non-conductive type clad layer of the ridges 2.

Thus structured, a change in refractive index due to an electro-optical effect in the optical waveguide layer 1A is induced by applying a controlling voltage between the electrodes 3 and an electrode disposed on a back surface of the substrate 1. As a result, the path of the optical signal guided along the ridges 2 can be switched.

FIGS. 2A and 2B show a structure of an optical switch according to the aforementioned Japanese laid-open publication No.3-216622.

With reference to FIGS. 2A and 2B, an optical switch formed on a GaAs substrate 5 includes an optical waveguide layer 5A sandwiched between a bottom side clad layer 5B and a top side clad layer 5C, which are respectively formed above the GaAs substrate 5 and doped as a reverse conductive type. Ridges 5D corresponding to an optical waveguide path are formed on the top side clad layer 5C. The ridges 5D have electrodes 6 formed thereon, and a back surface of the substrate 5 has an electrode 7 formed thereto.

Accordingly, the structure shown in FIGS. 2A and 2B also allows a change in refractive index due to an electro-optical effect in the optical waveguide layer 5A to be induced by applying a controlling voltage between the electrodes 6 and the electrode 7.

As the GaAs substrate, the structure shown in FIGS. 2A and 2B employs a GaAs single crystal being cut out in a manner extending in a (110) direction while having a main plane thereof tilting $\phi$ degrees from a (001) direction.

However, the foregoing conventional optical switches of optical guide types inevitably require to be formed having an extremely complicated structure for switching optical signals to multi-channels. Therefore, manufacture cost for the optical switches will correspondingly increase.

In the structure shown in Japanese patent laid-open publication No.4-234020, a TE mode and a TM mode are separated and are then recombined after optical switching is performed, so that polarization dependency (PMD: polarization mode dispersion) can be restrained. Such structure, however, has difficulty in preventing polarization dependency due to birefringence remaining in an optical system thereof since a GaAs crystal disposed on the GaAs substrate is employed as the optical system.

Meanwhile, although the structure shown in Japanese patent laid-open publication No.3-216622 is able to prevent the problem of polarization dependency, such structure requires the GaAs substrate to be cut out with a highly specific angle, and would therefore increase the cost for manufacturing the optical switch. Furthermore, the optical switch would require to be formed having an extremely complicated structure in order to achieve optical cross-connection of multiple channels.

Accordingly, the general object of the present invention is to solve the aforementioned problems by providing a novel and advantageous optical switch. A more concrete object of the present invention is to provide an optical switch having a simple structure, being able to prevent the problem of polarization dependency, and being able to easily achieve optical cross-connection of multiple channels.

In solving the foregoing problems, the present invention provides an optical switch which includes a slab waveguide having a first end surface and a second end surface, a first deflection portion being fixed to the first end surface and having a plurality of deflection elements formed thereon, a second deflection portion being fixed to the second end surface and having a plurality of deflection elements formed thereon, a first waveguide portion being optically coupled to the first deflection portion and having a plurality of channel waveguides formed therein, and a second waveguide portion being optically coupled to the second deflection portion and having a plurality of channel waveguides formed therein, wherein the slab waveguide has a waveplate disposed therein and arranged at a position where the distance between the waveplate and the first end surface is substantially equal to the distance between the waveplate and the second end surface.

It is preferable for the waveplate to be a half waveplate by which a polarization plane of an optical signal propagated through the slab waveguide is rotated 90 degrees. It is preferable for the slab waveguide to have a groove formed therein and arranged at a position where the distance between the groove and the first end surface is substantially equal to the distance between the groove and the second end surface, wherein the waveplate is fixed inside the groove in a state where a transparent medium is filled into a gap formed between the waveplate and the groove. It is preferable for the slab waveguide to have a first side wall surface and a second side wall surface in which the waveplate continuously extends from the first side wall surface and the second side wall surface. It is preferable for the first deflection portion and the second deflection portion to be crystals providing an electro-optical effect, wherein the deflection elements are electrodes to which electric voltage is applied. It is preferable for the first waveguide portion and the second waveguide portion to include a plurality of two dimensional lens arrays optically combined correspondingly with each channel waveguide of the plurality of channel waveguides.

It is preferable for the slab waveguide to be formed of a bottom clad layer having a planar shape disposed on a substrate, a core layer having a planar shape disposed on the bottom clad layer, and a top clad layer having a planar shape disposed on the core layer.

It is preferable for the waveplate to be contained in the groove formed in the slab waveguide. It is preferable for the groove to be formed traversing across the slab waveguide, wherein the groove is formed with a depth which reaches to the substrate. It is preferable for the gap formed between the groove and the waveplate to have a size no greater than several tens of micrometers, wherein the gap is filled with an optical adhesive agent which is transparent.

Since the optical switch of the present invention switches the path of optical signals inside a slab waveguide, the optical switch is not required to be formed with a complicated structure, even for providing optical cross-connection of multiple channels. In such a case, the polarization plane of the optical signals propagated through the slab waveguide rotates 90 degrees by disposing a waveplate (preferably a ½ waveplate) at a center portion of the slab waveguide. As a result, the TE mode signal light and the TM mode signal light become switched at a former half portion and a latter half portion of the half waveplate, in which the time lag between TE mode signal light and the TM signal light created in the former half portion of the slab waveguide is countervailed at the latter half portion of the half waveplate, to thereby compensate the polarization dependency in the optical switch.

Furthermore, in the present invention, the polarization dispersion loss (PDL) during the propagation of the TE mode optical signal and the TM mode optical signal through the flat slab waveguide, that is, the loss difference between the optical component in a direction normal to the flat core layer of the slab waveguide and the optical component in a direction parallel to the flat core layer of the slab waveguide is compensated at the former half portion and the latter half portion of the slab waveguide since the polarization plane of the optical signals is rotated 90 degrees at the half waveguide. The effect is created in the slab waveguide but also in the electro-optical crystal, and the microlens array. Accordingly, the optical switch of the present invention can be formed with a simple structure, and thus achieve a desirable polarization independent characteristic.

SUMMARY OF THE INVENTION

It is a general object of the present invention to provide an optical switch that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical switch particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical switch, including a slab waveguide having a first end surface and a second end surface, a first deflection portion being fixed to the first end surface and having a plurality of deflection elements formed thereon, a second deflection portion being fixed to the second end surface and having a plurality of deflection elements formed thereon, a first waveguide portion being optically coupled to the first deflection portion and having a plurality of channel waveguides formed therein, and a second waveguide portion being optically coupled to the second deflection portion and having a plurality of channel waveguides formed therein, wherein the slab waveguide has a waveplate disposed therein and arranged at a position where the distance between the waveplate and the first end surface is substantially equal to the distance between the waveplate and the second end surface.

Other objects and further features of the present invention will be apparent from the following detailed description when read in conjunction with the accompanying drawings.

BRIEF DESCRIPTION OF THE DRAWINGS

FIG. 3A is a plan view showing a first embodiment of an optical switch to which the present invention is applied;

FIG. 3B is a side cross-sectional view showing a first embodiment of an optical switch to which the present invention is applied;

DESCRIPTION OF THE PREFERRED EMBODIMENTS

Figure 1:
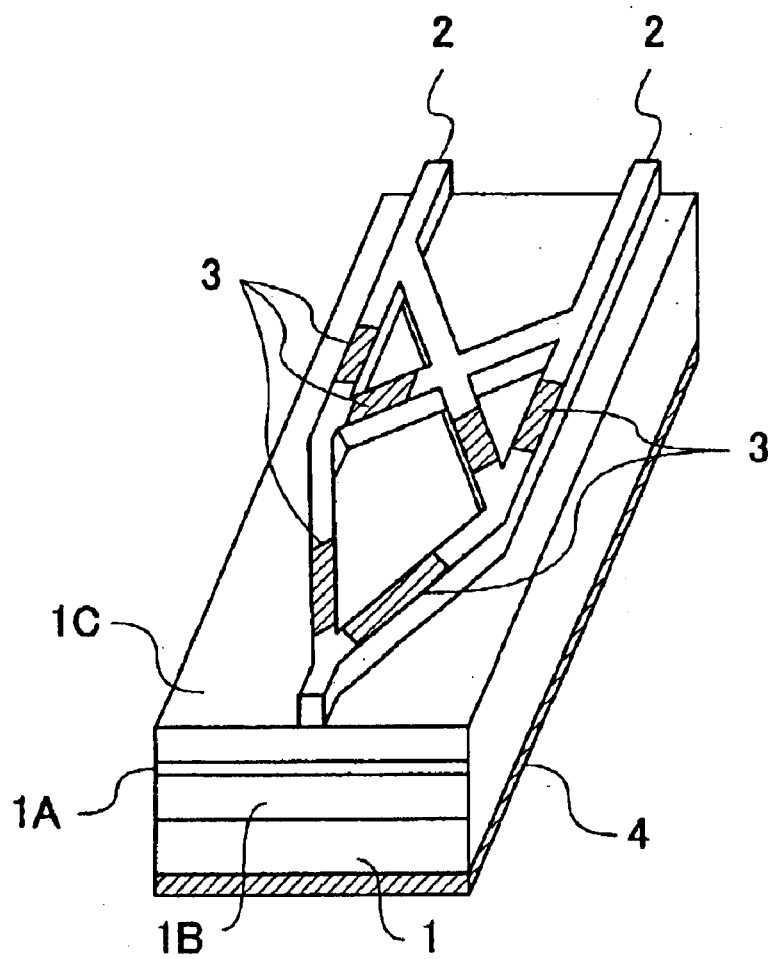
FIG. 1 is a drawing showing a structure of a conventional optical switch.
Figure 2A:
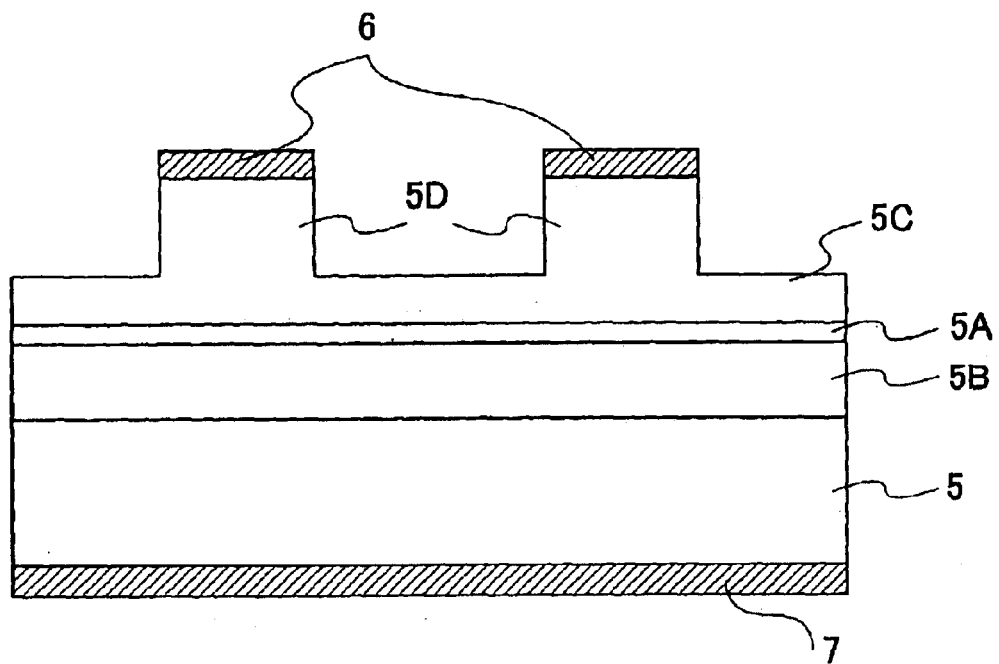
FIGS. 2A and 2B are drawings showing a structure of another conventional optical switch.
Figure 2B:
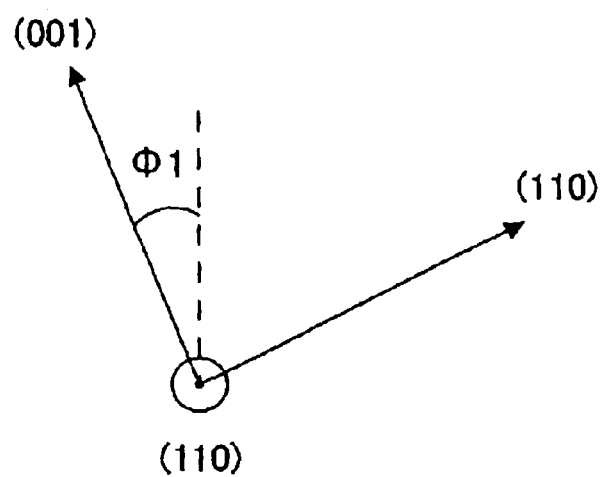

In the following, embodiments of the present invention will be described with reference to the accompanying drawings.

FIG. 3A is a plan view showing a first embodiment of an optical switch 10 to which the present invention is applied, and FIG. 3B is a side cross-sectional view showing a first embodiment of an optical switch 10 to which the present invention is applied.

With reference to FIGS. 3A and 3B, the optical switch 10 is formed on a substrate 11 being composed of Si or $SiO_2$, in which the substrate 11 carries a slab waveguide 12 thereon. The slab waveguide 12 has a bottom portion $SiO_2$ clad layer 12a and a top portion $SiO_2$ clad layer 12b with a core layer 12c doped with Ge or the like disposed therebetween.

An electro-optical crystal (first deflection portion) 13 is carried on the substrate 11 and fixed to one end surface (first end surface) 30 of the slab waveguide 12. The electro-optical crystal 13 composed of PZT (Pb(Zr, Ti)$O_3$) or PLZT ((Pb,La) (Zr,Ti)$O_3$) has a core layer 13c, which corresponds to the core layer 12c, being sandwiched between a pair of clad layers 13a and 13b. In correspondence to the number of channels desired for the input side, electrodes 13A with prism-like shapes are numerously formed on the electro-optical crystal 13.

Likewise, an electro-optical crystal (second deflection portion) 14 is carried on the substrate 11 and fixed to the other end surface (second end surface) 31 of the slab waveguide 12, and thus being layered in a same manner as that of the electro-optical crystal 13. In correspondence to the number of channels desired for the output side, electrodes 14A with prism-like shapes are numerously formed on the electro-optical crystal 14.

A two dimensional microlens array $15_1$ having the same layered structure as that of the slab waveguide 12 is formed on the substrate 11 and is positioned at an outer side of the electro-optical crystal 13, wherein each two dimensional microlens is formed in correspondence to each electrode 13A formed on the electro-optical crystal 13. Furthermore, another two dimensional microlens array $15_2$ having the same layered structure as that of the slab waveguide 12 is formed on the substrate 11, in which the two dimensional microlens array $15_2$ includes plural microlenses where each of the microlenses faces against each of the microlenses of the foregoing two dimensional microlens array $15_1$. Each microlens in the two dimensional microlens array $15_2$ has an input channel waveguide 17A to 17D formed therein. An optical medium, which is formed with a lower refractive index than that of the material used for the slab waveguide, is filled between the two dimensional microlens array $15_1$ and the two dimensional microlens array $15_2$, to thereby form an optical combined portion (first waveguide portion) 15.

Likewise, a two dimensional microlens array $16_1$ having the same layered structure as that of the slab waveguide 12 is formed on the substrate 11 and is positioned at an outer side of the electro-optical crystal 14, wherein each two dimensional microlens is formed in correspondence to each electrode 14A formed on the electro-optical crystal 14. Furthermore, another two dimensional microlens array $16_2$ having the same layered structure as that of the slab waveguide 12 is formed on the substrate 11, in which the two dimensional microlens array $16_2$ includes plural microlenses where each of the microlenses faces against each of the microlenses of the foregoing two dimensional microlens array $16_1$. Each microlens in the two dimensional microlens array $16_2$ has an output channel waveguide 18A to 18D correspondingly formed therein. An optical medium, which is formed with a lower refractive index than that of the material used for the slab waveguide, is filled between the two dimensional microlens array $16_1$ and the two dimensional microlens array $16_2$, to thereby form an optical combined portion (second waveguide portion) 16.

The slab waveguide 12 is formed as a united body with the substrate 11. The optical combined portion 15 and the optical combined portion 16 are also formed as a united body with the substrate 11. On the other hand, the electro-optical crystal 13 and the electro-optical crystal 14 are placed on the substrate 11 and are fixed thereto with use of an optical medium such as an optical adhesive agent.

Although not illustrated, an electrode pattern is formed on a surface of the substrate 11 to which the electro-optical crystal 13 and the electro-optical crystal 14 are mounted. Thereby, applying a controlling voltage to the prism shaped electrodes 13A or 14A induces a change into a prism refractive index.

In FIG. 3A and FIG. 3B, a groove 19 is formed in the slab waveguide 12 in a manner traversing across the slab waveguide 12 from a first side wall surface 32 of the slab waveguide 12 to a second side wall surface 33 of the slab waveguide 12. The slab waveguide 12 has the first end 30 facing the electro-optical crystal 13 and the second end surface 31 facing the electro-optical crystal 14, in which the distance between the first end surface 30 and the groove 19 is substantially equal to the distance between the second end surface 31 and the groove 19. Accordingly, the groove divides the slab waveguide 12 into a former half portion 12A and a latter half portion 12B. The groove 19 has a half waveplate (½ waveplate) 20 inserted therein in a manner continuously extending from the first side wall surface 32 and the second side wall surface 33. As widely known, the half waveplate 20 is an optical element creating a phase difference of a ½ wavelength between two perpendicularly intersecting polarized components.

Next, the action of the optical switch shown in FIGS. 3A and 3B will be described.

With reference to FIG. 3A, for example, in a case where a light enters the channel waveguide 17A, a light beam diverged from an outgoing end of the channel waveguide 17A, is converted into a parallel light having a wide beam width with low divergence through oppositely facing two dimensional lenses in the two dimensional lens array 15, and is then incident on the electro-optical crystal 13. The parallel light beam would not diverge in a direction normal to the main plane of the substrate 11 owing to a confining effect of clad layers 15a and 15b, and would, therefore, have a flat cross-section when viewed from a direction in which the light beam advances.

By applying a drive voltage to the prism shaped electrode 13A disposed in an area where the flat parallel light beam is incident thereon, the prism refractive index change induced in the electro-optical crystal 13 deflects the light beam. The light beam then proceeds diagonally in the slab waveguide 12 and then enters the electro-optical crystal 14 positioned on an output end side. Since the slab waveguide 12 provides a waveguide effect only in a direction normal to the main plane of the substrate 11, the light beam can be deflected in a discretional angle by applying voltage to the electrode 13A. Therefore, the electro-optical crystal 13 and the electrode 13A serve as a light beam deflection means. In propagating the light beam in the slab waveguide 12, since the gap between the half waveplate 20 and the groove 19 is filled with an optical adhesive agent or the like (transparent medium) 19A, the light beam will not reflect, and the diagonal path of the light beam will not be changed substantially.

Accordingly, the light beam propagated through the slab waveguide 12 and diagonally oriented into the electro-optical crystal 14 can be polarized in a direction toward the output channel waveguide (e.g. output channel waveguide 18C) by applying a prescribed controlling voltage to the electrode 14A corresponding to a portion in the electro-optical crystal 14 to which the light beam has entered. In such manner, the polarized light beam is converged by the two dimensional microlenses $16_1$ and $16_2$, and is oriented into a desired output channel waveguide 18C.

In the same manner, incident optical signals from other input channel waveguides 17B, 17C, or 17D can also be guided to a desired output channel waveguide 18A to 18D.

Accordingly, by the employment of the slab waveguide 12, the optical switch shown in FIG. 3A and FIG. 3B is formed with an extremely simple structure, and serves as a multi-channel optical switch. It is apparent in the above description that the number of the input channel waveguides 17A to 17D is not required to match with the number of the output channel waveguides 18A to 18D. That is, the optical switch of the present invention can easily serve as n×m optical cross connecting switch.

In this embodiment where the light beam is propagated through the slab waveguide 12, polarization dependency from birefringence will not be caused since the slab waveguide 12 is formed of glass; nevertheless, a speed difference between a TE mode optical signal and a TM mode optical signal may be created relative to the condition of the border of the slab waveguide 12.

Figure 4A:
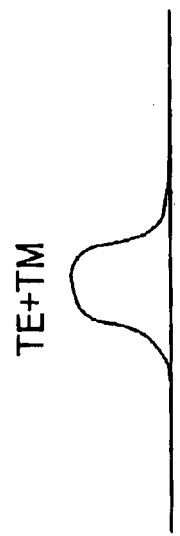
FIGS. 4A, 4B, and 4C are drawings for explaining the action of an optical switch to which the present invention is applied.
Figure 4B:
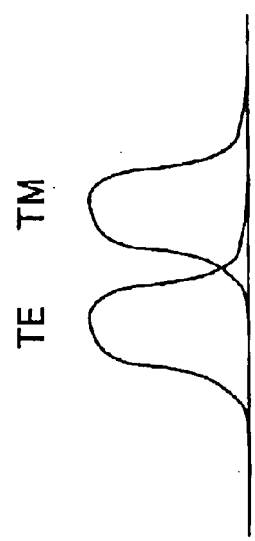

Therefore, although the TE mode component and the TM mode component of the optical signal are matched on the time axis (see FIG. 4A) during traveling through the first end surface (input-side end surface) of the slab waveguide 12, one mode with respect to the other mode becomes delayed (see FIG. 4B) as the optical signal further propagates in the slab waveguide 12. Overlapping the optical signals with such phase difference in the output channel waveguide will cause optical waveform to deteriorate.

Figure 4C:
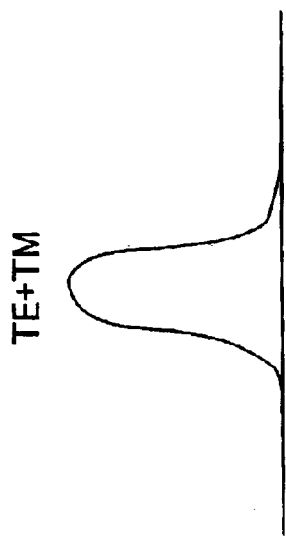

Therefore, in this invention, the half waveplate 20 is disposed in a center portion of the slab waveguide 12, so that a plane of polarized light can be rotated 90 degrees. As a result, the TE mode component is converted to the TM mode component, and the TM mode component is converted to the TE mode component. Accordingly, the phase difference caused in the area 12A of the slab waveguide 12 is conversely shortened at the area 12B of the slab waveguide 12. The phase difference at the position of electro-optical crystal 14, then, recovers to a waveform where the TM mode component and the TE mode component are matched in a manner shown in FIG. 4C. This effect not only occurs at the slab waveguide 12, but also at the electro-optical crystals 13, 14, and the microlens arrays 15, 16.

Accordingly, the optical switch shown in FIGS. 3A and 3B having a simple structure is able to solve the aforementioned problem of PMD.

From the perspective of the guided direction of the light beam, FIGS. 5A to 5E show the changes in amplitude of the TE mode and the TM mode of the light beam propagated through the slab waveguide 12 in the optical switch in FIGS. 3A and 3B.

Figure 5A:
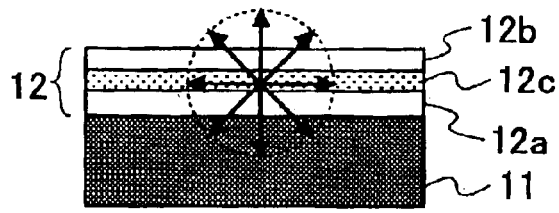
FIGS. 5A to 5E are another set of drawings for explaining the action of an optical switch to which the present invention is applied.

FIG. 5A shows the amplitude distribution of the light beam incident on the input-side end surface of the slab waveguide 12. As a beam incident on the slab waveguide 12 has random polarization planes, polarization components of random polarization planes enter the slab waveguide 12. In such a case, no polarization component of a particular direction has greater strength than that of another light polarization component of a particular direction, and therefore, such balanced optical amplitude distribution has no polarization dependency.

Figure 5B:
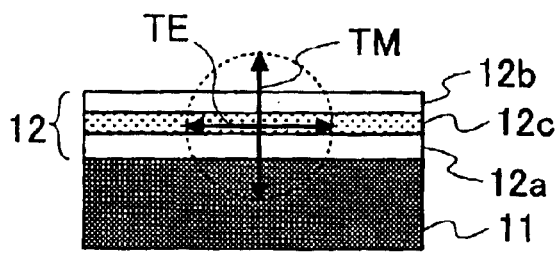

In FIG. 5B, the incident optical beam formed of random polarization wave components shown in FIG. 5A is divided into the TE mode component mainly having a polarization wave component parallel to the substrate plane, and the TM mode component mainly having a polarization wave component normal to the substrate plane.

Figure 5C:
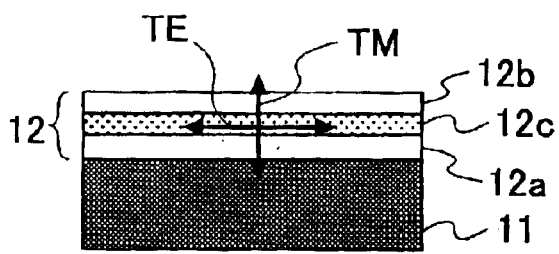

When such light beam is propagated through the slab waveguide 12, the relatively weak confining effect of the thin clad layers 12a and 12b at the waveguide 12 in a direction normal to the substrate 11 causes loss of strength for the TM mode component in a manner shown in shown in FIG. 5C, thereby resulting to PDL (polarization dependent loss).

Figure 5D:
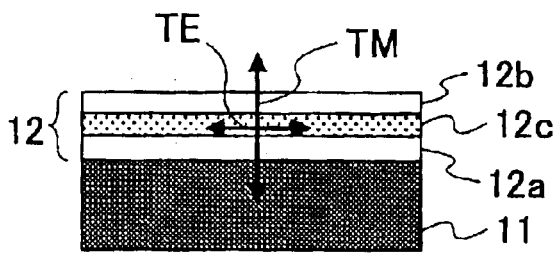
Figure 5E:
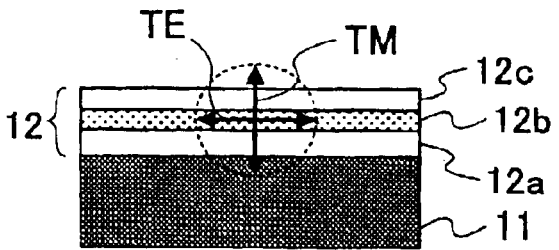

On the other hand, since the plane polarization wave of the light beam propagated through the area (former half portion) 12A of the slab waveguide 12 is rotated 90 degrees by the half waveplate 20, the strength of the TE mode component and the TM mode component changes in the manner shown in FIG. 5D when the light beam enters the area (latter half portion) 12B of the optical wave guide 12. The strength of the TM mode component gradually weakens as the light beam propagates in the area 12B. The strength between the TE mode component and the TM mode component become substantially equal at the point where the light beam enters the electro-optical crystal 14, to thereby compensate for PDL. This effect not only occurs with respect to the slab waveguide 12, but also with respect to the electro-optical crystals 13, 14, and the microlens arrays 15, 16.

For compensating the problems of PMD and PDL, this embodiment positions the half waveplate almost exactly between the input-side end surface (first end surface) of the slab type waveguide 12 and the output-side end surface (second end surface) of the slab type waveguide 12.

Next, a method of manufacturing the optical switch shown in FIGS. 3A and 3B will be described with reference to FIGS. 6A to 6D. It is to be noted that FIGS. 6A to 6D only describe steps for disposing the half waveplate 20.

Figure 6A:
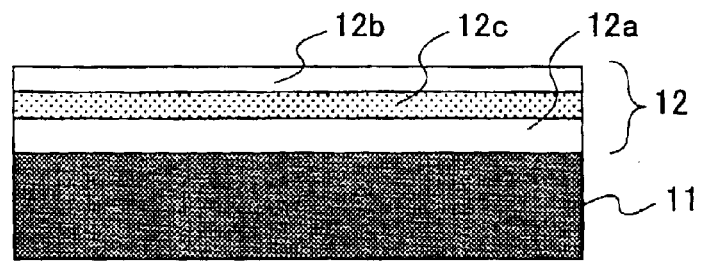
FIGS. 6A to 6D are drawings for explaining a manufacturing process of an optical switch to which the present invention is applied.
Figure 6B:
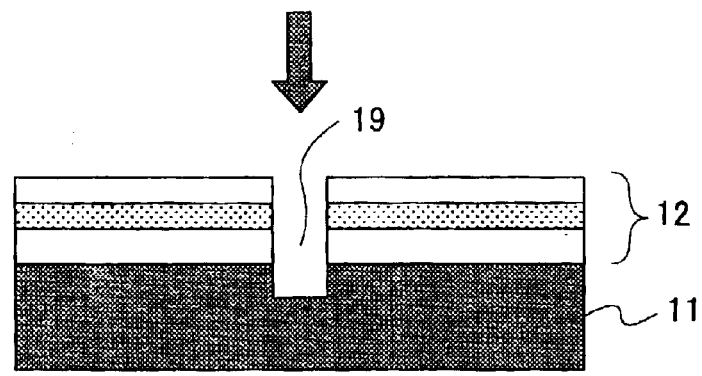

With reference to FIG. 6A, the core layer 12c is formed on the substrate 11 in a manner longitudinally sandwiched between the clad layers 12a and 12b. In the step shown in FIG. 6B, the groove 19 is formed perpendicular to the substrate 11 and in a depth reaching the substrate 11 by using a dicing saw or the like. The width of the groove 19 is set to be approximately 10 micrometers larger than the thickness of the half waveplate 20.

Figure 6C:
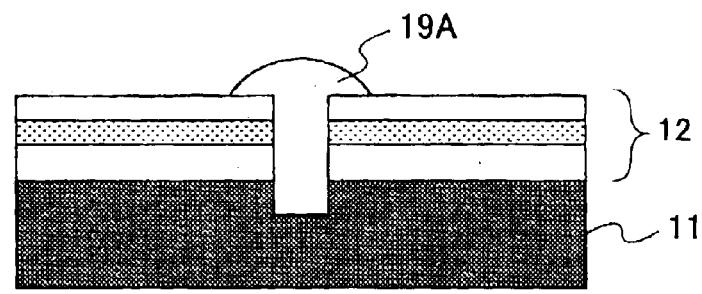
Figure 6D:
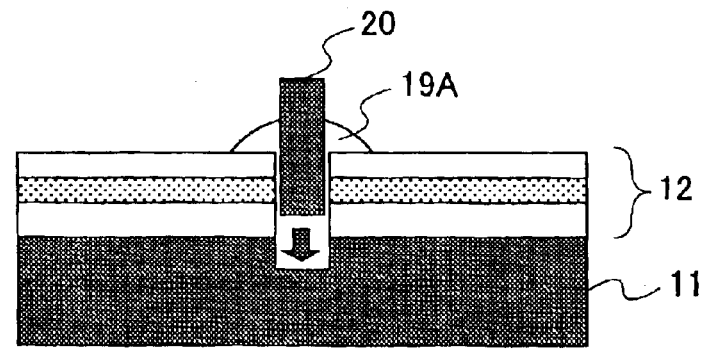

Next, in the step shown in FIG. 6C, the groove 19 is filled with an optical adhesive agent 19A which is transparent. In the step shown in FIG. 6D, the half waveplate 20 is inserted into the groove 19. In such case, the optical loss during the passing of the optical beam through the groove 19 and the half waveplate 20 can be restrained to 0.5 dB or less when the space between the half waveplate 20 and the groove 19 is approximately several tens of micrometers. A thin plate formed on a film base material is preferable to be used as the half waveplate 20.

It is to be noted that two ¼ waveplates (quarter waveplates) may also be used as the half waveplate.

Since the optical switch of the present invention switches the path of optical signals inside a slab waveguide, the optical switch is not required to be formed with a complicated structure, even for providing optical cross-connection of multiple channels. In such a case, the polarization plane of the optical signals propagated through the slab waveguide rotates 90 degrees by disposing a waveplate (preferably a ½ waveplate) at a center portion of the slab waveguide. As a result, the TE mode signal light and the TM mode signal light become switched at the former half portion and the latter half portion of the half waveplate, in which the time lag between TE mode signal light and the TM signal light created in the former half portion of the slab waveguide is countervailed at the latter half portion of the half waveplate, to thereby compensate the polarization dependency in the optical switch. The effect is created in the slab waveguide but also in the electro-optical crystal, and the microlens array.

Furthermore, in the present invention, the polarization dispersion loss (PDL) during the propagation of the TE mode optical signal and the TM mode optical signal through the flat slab waveguide, that is, loss difference between the optical component in a direction normal to the flat core layer of the slab waveguide and the optical component in a direction parallel to the flat core layer of the slab waveguide is compensated at the former half portion and the latter half portion of the slab waveguide since the polarization plane of the optical signals is rotated 90 degrees at the half waveguide. The effect is created in the slab waveguide but also in the electro-optical crystal, and the microlens array. Accordingly, the optical switch of the present invention can be formed with a simple structure, and thus achieve a desirable polarization independent characteristic.

Further, the present invention is not limited to these embodiments, but various variations and modifications may be made without departing from the scope of the present invention.

What is claimed is:

1. An optical switch, comprising:
  a slab waveguide having a first end surface and a second end surface;
  a first deflection portion being fixed to the first end surface and having a plurality of deflection elements formed thereon;
  a second deflection portion being fixed to the second end surface and having a plurality of deflection elements formed thereon;
  a first waveguide portion being optically coupled to the first deflection portion and having a plurality of channel waveguides formed therein; and
  a second waveguide portion being optically coupled to the second deflection portion and having a plurality of channel waveguides formed therein,
  wherein the slab waveguide has a waveplate disposed therein and arranged at a position where the distance between the waveplate and the first end surface is substantially equal to the distance between the waveplate and the second end surface.

2. The optical switch as claimed in claim 1, wherein the waveplate is a half waveplate by which a polarization plane of an optical signal propagated through the slab waveguide is rotated 90 degrees.

3. The optical switch as claimed in claim 1, wherein the slab waveguide has a groove formed therein and arranged at a position where the distance between the groove and the first end surface is substantially equal to the distance between the groove and the second end surface, wherein the waveplate is fixed inside the groove in a state where a transparent medium is filled into a gap formed between the waveplate and the groove.

4. The optical switch as claimed in claim 1, wherein the slab waveguide has a first side wall surface and a second side wall surface in which the waveplate continuously extends from the first side wall surface and the second side wall surface.

5. The optical switch as claimed in claim 1, wherein the first deflection portion and the second deflection portion are crystals providing an electro-optical effect, wherein the deflection elements are electrodes to which electric voltage is applied.

6. The optical switch as claimed in claim 1, wherein the first waveguide portion and the second waveguide portion include a plurality of two dimensional lens arrays optically combined correspondingly with each channel waveguide of the plurality of channel waveguides.

7. The optical switch as claimed in claim 1, wherein the slab waveguide is formed of a bottom clad layer having a planar shape disposed on a substrate, a core layer having a planar shape disposed on the bottom clad layer, and a top clad layer having a planar shape disposed on the core layer.

8. The optical switch as claimed in claim 1, wherein the groove is formed traversing across the slab waveguide, wherein the groove is formed with a depth which reaches to the substrate.

9. The optical switch as claimed in claim 1, wherein the gap formed between the groove and the waveplate has a size no greater than several tens of micrometers, wherein the gap is filled with an optical adhesive agent which is transparent.

* * * * *